United States Patent
Yu

(10) Patent No.: US 12,026,827 B2
(45) Date of Patent: Jul. 2, 2024

(54) METHOD, APPARATUS, SYSTEM, AND STORAGE MEDIUM FOR 3D RECONSTRUCTION

(71) Applicant: UISEE TECHNOLOGIES (ZHEJIANG) LTD., Jiaxing (CN)

(72) Inventor: Lidong Yu, Nanjing (CN)

(73) Assignee: UISEE TECHNOLOGIES (ZHEJIANG) LTD., Jiaxing (CN)

( * ) Notice: Subject to any disclaimer, the term of this patent is extended or adjusted under 35 U.S.C. 154(b) by 180 days.

(21) Appl. No.: 17/787,339

(22) PCT Filed: Dec. 20, 2019

(86) PCT No.: PCT/CN2019/127020
§ 371 (c)(1),
(2) Date: Jun. 20, 2022

(87) PCT Pub. No.: WO2021/120175
PCT Pub. Date: Jun. 24, 2021

(65) Prior Publication Data
US 2023/0040550 A1 Feb. 9, 2023

(51) Int. Cl.
*G06T 15/20* (2011.01)
*G06T 7/00* (2017.01)
(Continued)

(52) U.S. Cl.
CPC .......... *G06T 15/205* (2013.01); *G06T 7/0012* (2013.01); *G06T 7/55* (2017.01);
(Continued)

(58) Field of Classification Search
CPC ......... G06T 15/205; G06T 7/70; G06T 15/08; G06T 7/55; G06T 17/00; G06T 7/0012;
(Continued)

(56) References Cited

U.S. PATENT DOCUMENTS

2009/0279784 A1* 11/2009 Arcas .................. G06T 15/205
382/190
2015/0178988 A1  6/2015 Montserrat Mora et al.
(Continued)

FOREIGN PATENT DOCUMENTS

CN       108898630 A       11/2018
CN       109801374 A       5/2019
(Continued)

OTHER PUBLICATIONS

Cheng Peng, et al., Adaptive View Planning for Aerial 3D Reconstruction of Complex Scenes, ECCV-18 submission ID 3050, 2018, pp. 1-14.
(Continued)

*Primary Examiner* — Xilin Guo
(74) *Attorney, Agent, or Firm* — Bayramoglu Law Offices LLC

(57) ABSTRACT

A method, device, computer system and computer readable storage medium for 3D reconstruction are provided. The method comprises: performing a 3D reconstruction of an original 2D image of a target object to generate an original 3D object corresponding to the original 2D image; selecting a complementary view of the target object from candidate views based on a reconstruction quality of the original 3D object at the candidate views; obtaining a complementary 2D image of the target object based on the complementary view; performing a 3D reconstruction of the complementary 2D image to generate a complementary 3D object corresponding to the complementary 2D image; and fusing the original 3D object and the complementary 3D object to obtain a 3D reconstruction result of the target object.

20 Claims, 6 Drawing Sheets

(51) Int. Cl.
*G06T 7/55* (2017.01)
*G06T 7/70* (2017.01)
*G06T 15/08* (2011.01)
*G06T 17/00* (2006.01)

(52) U.S. Cl.
CPC ............... *G06T 7/70* (2017.01); *G06T 15/08* (2013.01); *G06T 17/00* (2013.01); *G06T 2200/08* (2013.01); *G06T 2207/20081* (2013.01); *G06T 2207/20084* (2013.01); *G06T 2207/20221* (2013.01); *G06T 2207/30168* (2013.01); *G06T 2207/30244* (2013.01)

(58) Field of Classification Search
CPC . G06T 2207/20076; G06T 2207/20084; G06T 2207/10016; G06T 2200/08; G06T 2207/20221; G06T 2207/20081; G06T 2207/30244; G06T 2207/30168; G06T 19/20; G06T 19/00; G06T 2200/04; G06T 15/00; G06T 2207/20108; G06N 3/045; G06N 3/08; G06V 20/64; G06V 20/647; G06V 10/25
See application file for complete search history.

(56) References Cited

U.S. PATENT DOCUMENTS

| | | | | |
|---|---|---|---|---|
| 2019/0026956 | A1* | 1/2019 | Gausebeck | G06T 19/20 |
| 2019/0313083 | A1* | 10/2019 | Chavez | G06F 3/011 |
| 2021/0287430 | A1* | 9/2021 | Li | G06V 10/776 |
| 2021/0312698 | A1* | 10/2021 | He | G06V 10/454 |

FOREIGN PATENT DOCUMENTS

| | | |
|---|---|---|
| CN | 110047144 A | 7/2019 |
| CN | 110288712 A | 9/2019 |
| CN | 110490917 A | 11/2019 |
| CN | 110570522 A | 12/2019 |
| EP | 1308902 A2 | 5/2003 |
| EP | 1308902 A3 | 1/2004 |
| JP | 2003196327 A | 7/2003 |
| JP | 2004302524 A | 10/2004 |
| JP | 2011043879 A | 3/2011 |
| JP | 2018163468 A | 10/2018 |
| KR | 20170007098 A | 1/2017 |
| KR | 20180062959 A | 6/2018 |
| KR | 20210128203 A | 10/2021 |
| KR | 20220024517 A | 3/2022 |
| WO | 2014112911 A1 | 7/2014 |
| WO | 2014191055 A1 | 12/2014 |

OTHER PUBLICATIONS

Aldo Laurentini, Surface reconstruction accuracy for active vol. intersection, Pattern Recognition Letters, 1996, pp. 1285-1292, vol. 17.

Ryota Natsume, et al., SiCloPe: Silhouette-Based Clothed People, 2018, pp. 1-10.

* cited by examiner

METHOD, APPARATUS, SYSTEM, AND STORAGE MEDIUM FOR 3D RECONSTRUCTION

CROSS-REFERENCE TO RELATED APPLICATION

This application is a national phase of International Patent Application No. PCT/CN2019/127020 filed on Dec. 20, 2019. The disclosures of the aforementioned applications are hereby incorporated by reference in their entireties.

TECHNICAL FIELD

This disclosure relates to the field of computer visual technology, and more particularly to a 3D reconstruction method, apparatus, system, and storage medium.

BACKGROUND 3D (Three-dimensional) reconstruction is a process of generating a corresponding 3D object based on known 2D (two-dimensional) images. Since 2D images describe a target object taken at specific camera views, they can only reflect features of the target object under the specific views, but cannot show all features of the target object. In theory, more camera views are selected when photographing the target object, the higher the reproduction of the 3D object generated by the 3D reconstruction relative to the target object, and the better the reconstruction quality.

However, in practice, it is impossible to reconstruct a large number of 2D images into 3D images without limitation considering the cost of computer resources, time, human, and so on. Therefore, how to select 2D images under suitable views and perform a 3D reconstruction based on the selected 2D images becomes an urgent problem to be resolved by a person skilled the art.

SUMMARY

The present disclosure is proposed in consideration of the above problems.

An aspect of the present disclosure provides a method for 3D reconstruction. The method comprises:
performing a 3D reconstruction of an original 2D image of a target object to generate an original 3D object corresponding to the original 2D image;
selecting a complementary view of the target object from candidate views based on a reconstruction quality of the original 3D object at the candidate views;
obtaining a complementary 2D image of the target object based on the complementary view;
performing a 3D reconstruction of the complementary 2D image to generate a complementary 3D object corresponding to the complementary 2D image; and
fusing the original 3D object and the complementary 3D object to obtain a 3D reconstruction result of the target object.

In some embodiments, said performing 3D reconstruction of the original 2D image of the target object comprises:
Extracting original image features from the original 2D image; Decoding the original image features by a voxel neural network to obtain a voxel cube of the target object;
Determining the original 3D object based on the voxel cube.

In some embodiments, said selecting a complementary view of the target object from candidate views comprises:
performing regression analysis for the original 3D object to determine reconstruction quality of the original 3D object in a plurality of candidate views; and
determining the candidate view corresponding to the worst reconstruction quality as the complementary view.

In some embodiments, said performing regression analysis for the original 3D object is implemented by a first neural network, wherein the first neural network is trained by:
obtaining a training 3D object of a realistic training object;
obtain a training 2D image of the training object, and performing a 3D reconstruction based on the training 2D image of the training object to generate a training reconstruction object;
performing projection of the training reconstruction object based on a predetermined training view to obtain a first projected depth map;
performing projection of the training 3D object based on the predetermined training view to obtain a second projected depth map;
calculating a difference degree between the first projection depth map and the second projection depth map;
training the first neural network with the training reconstruction object as input data and the difference degree as ground truth.

In some embodiments, said calculating a difference degree between the first projection depth map and the second projection depth map comprises:
obtaining a first depth value of each visible voxel of the training reconstruction object at the training view in the first projection depth map;
obtaining a second depth value of corresponding voxels of the training 3D object in the second projection depth map for each first depth value;
calculating the ratio between the depth difference between the second depth value and the first depth value and the second depth value; and
averaging the ratio of all visible voxels of the training reconstructed object in the first projection depth map at the training view for obtaining the difference degree.

In some embodiments, said training the first neural network comprises:
obtaining output data of the first neural network based on the input data;
calculating a loss function of the first neural network based on the output data and the ground truth; and
updating parameters of the first neural network based on the loss function.

In some embodiments, said obtaining a complementary 2D image of the target object based on the complementary view comprises:
Selecting a 2D image corresponding to the view closest to the complementary view from database as the complementary 2D image; or
Acquiring the complementary 2D image by a camera, wherein the camera is adjusted based on the camera pose of the complementary view.

In some embodiments, said selecting a 2D image corresponding to the view closest to the complementary view from database comprises:
obtaining a pose identifier of the 2D image stored in the database, wherein the pose identifier may be used to identify a camera pose of a view corresponding to the 2D image;

determining pose difference between the camera pose corresponding to the 2D image and the camera pose corresponding to the complementary 2D image based on the pose identifier; and determining the 2D image corresponding to minimum pose difference as the complementary 2D image.

In some embodiments, the method further comprises:

determining whether the percentage of visible voxels in the 3D reconstruction result is greater than a first proportion;

in response to that it is not greater than the first proportion, taking the 3D reconstruction result as the original 3D object, and performing the 3D reconstruction again based on the complementary view until the percentage of visible voxels in the 3D reconstruction result is greater than the first proportion.

Another aspect of the present disclosure provides a device for 3D reconstruction, comprising:

a first reconstruction module 910, is configured to perform 3D reconstruction of an original 2D image of a target object to generate an original 3D object corresponding to the original 2D image;

a complementary view module 920, is configured to select a complementary view of the target object from candidate views based on reconstruction quality of the original 3D object at the candidate views;

a complementary image module 930, is configured to obtain a complementary 2D image of the target object based on the complementary view;

a second reconstruction module 940, is configured to perform 3D reconstruction of the complementary 2D image to generate a complementary 3D object corresponding to the complementary 2D image; and a fusing module 950, is configured to fuse the original 3D object and the complementary 3D object to obtain 3D reconstruction result of the target object.

Another aspect of the present disclosure provides a system for 3D reconstruction, comprising: a processor and a memory, wherein, the memory stores computer program instructions, the computer program instructions being executed by the processor to perform a method for 3D reconstruction described above.

Another aspect of the present disclosure provides a storage medium, storing computer program instructions, wherein the computer program instructions are executed to perform a method for 3D reconstruction described above.

According to the technical solution of embodiments of the present disclosure, determining complementary view based on reconstruction quality of a 3D object and performing 3D reconstruction using a 2D image at the complementary view can obtain a high-quality reconstruction of the 3D object using fewer 2D images.

The above description is only an overview of the technical solution of the present disclosure. In order to understand more clearly the technical means of the present disclosure, which can be implemented in accordance with the contents of the specification, and in order to make the above and other purposes, features and advantages of the present disclosure more obvious and understandable, specific embodiments of the present disclosure are given below.

BRIEF DESCRIPTION OF DRAWINGS

The foregoing and other objects, features and advantages of the present disclosure will become more apparent by a more detailed description of embodiments of the present disclosure in conjunction with the accompanying drawings.

The accompanying drawings are used to provide further understanding of embodiments of the present disclosure and form part of the specification and, together with embodiments of the present disclosure, are used to explain the disclosure and do not constitute a limitation of the disclosure. In the accompanying drawings, identical reference marks generally represent identical parts or steps.

DETAILED DESCRIPTION OF EMBODIMENTS

To make the objects, technical solutions, and advantages of the present disclosure more clear, exemplary embodiments of the present disclosure will be described in detail with reference to the accompanying drawings as follows. Obviously, the described embodiments merely are part of the embodiments of the present disclosure, rather than all of the embodiments of the present disclosure, it should be understood that the present disclosure is not limited to the exemplary embodiments described herein. Based on the embodiments described in the present disclosure, all other embodiments obtained by those skilled in the art without paying inventive efforts should fall into the protection scope of the present disclosure.

The method for 3D reconstruction described in the present disclosure is configured to select a more meaningful 2D image under a complementary view based on the feedback of the reconstruction quality of the original 2D image, and perform 3D reconstruction based on the 2D image under original view and the 2D image under the complementary view to obtain a reconstructed 3D object with better reconstruction quality using fewer 2D images.

Figure 1:
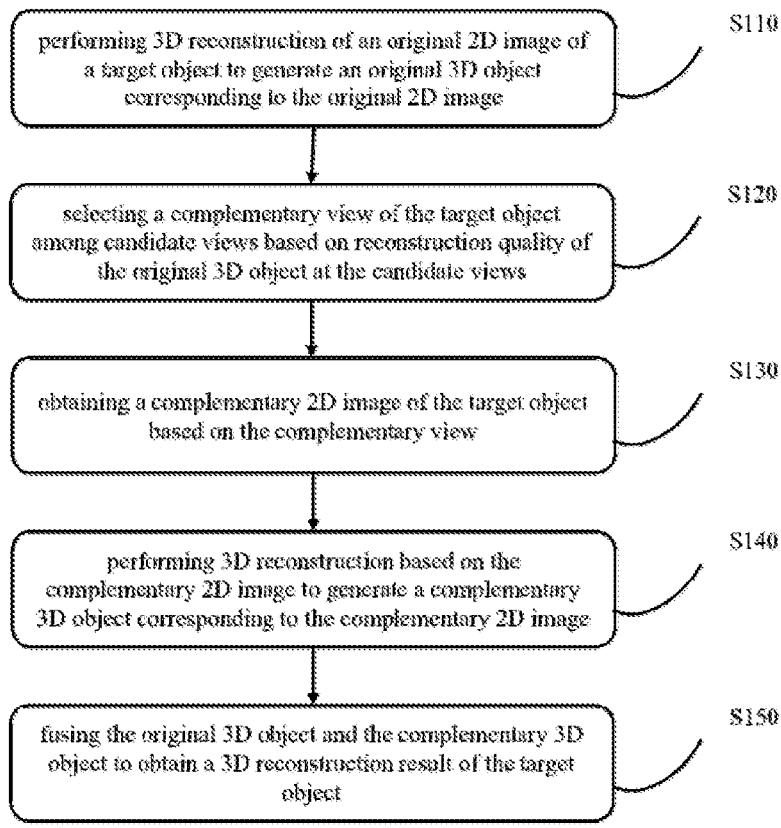
FIG. 1 illustrates a flow chart of a method 100 for 3D reconstruction according to an embodiment of the present disclosure.

FIG. 1 illustrates a flow chart of a method 100 for 3D reconstruction according to an embodiment of the present disclosure. As shown in FIG. 1, the method 100 includes the following steps.

S110: performing 3D reconstruction of an original 2D image of a target object to generate an original 3D object corresponding to the original 2D image.

The original 2D image may be an image of the target object captured directly by an imaging device, for example, a camera or a video camera. The original 2D image may also be a pre-processing image. For example, a pre-processing operation, such as filtering, can be performed on the captured image to obtain the original 2D image with a better quality. The original 2D image may be a single image captured in a single view, or multiple images captured in multiple different views.

The method 100 for 3D construction can be implemented using an existing or developing method for 3D construction based on known 2D images to generate original 3D object, for example, method for 3D construction based on a neural network.

The generated original 3D object is corresponding to the original 2D image. The original 3D object may be represented by a Point Cloud, a Mesh, a Voxel, or a Depth Map, etc. In an embodiment of the present disclosure, the original 3D object may be represented by Voxel. The representation of Voxel is to consider the space of the target object as a Voxel cube consisting of multiple cubes, the value of each cube indicating whether the object exits a voxel at the space position of each cube. For example, the value of 0 may indicate that no voxel exists in the space position corresponding to the cube, and the value of 1 may indicate that a voxel exists.

S120: selecting a complementary view of the target object among candidate views based on reconstruction quality of the original 3D object at the candidate views.

It can be understood that each 2D image corresponds to a camera view, the camera view being the view that the camera captures the 2D image. The camera view is determined by the camera pose, and the camera view can be represented by the camera pose. The camera pose is the position and attitude of the camera when capturing a 2D image, and can be represented based on various coordinate systems. The following is an example of the camera pose in a spherical coordinate system. For example, the location of the target object can be taken as the origin of the spherical coordinate system, and the camera pose can be represented by R and T. $R=[\alpha, \beta]$, wherein $\alpha$ represents azimuth of the camera and $\beta$ represents the elevation of the camera; T represents the distance $\rho$ between the camera and the target object.

A person having ordinary skill in the art understands that there is a corresponding transformation relationship between the world coordinate system and the spherical coordinate system. If the coordinate (x, y, z) of the camera in the world coordinate system is known, the azimuth $\alpha$, the elevation $\beta$, and the distance $\rho$ can be known correspondingly, wherein x denotes the coordinates of the camera in the X-axis, y denotes the coordinates of the camera in the Y-axis, z denotes the coordinates of the camera in the Z-axis.

A person having ordinary skill in the art understands that the camera pose can be determined based on the camera parameters corresponding to the original 2D image for a given original 2D image. For simplicity of description, the view corresponding to the camera pose of the original 2D image can be referred to as a first view.

In the basis of the first view of the known original 2D image, the present step determines a new complementary view from the candidate view based on the reconstruction quality, wherein the complementary view is different from the first view. In other words, the camera pose corresponding to the complementary view is different from the camera pose corresponding to the first view.

The reconstruction quality represents the similarity between the original 3D object generated by the reconstruction and the actual target object. The reconstruction quality of the original 3D object in a specific view represents the similarity between visible part of the original 3D object in the specific view and the corresponding part of the target object. The reconstruction quality of the original 3D object in different views is different. The reconstruction quality of the original 3D object in the first view is best, because the visible part of the original 3D object in the first view may include the most credible information from the original 2D image. The visible part of the original 3D object in other views may contain more or less predict information that is not present in the original 2D image, so the reconstruction quality is slightly worse.

Exemplarily, the complementary view may be selected from the candidate views based on the reconstruction quality according to predetermined rules. For example, a candidate view whose reconstruction quality is within a preset threshold is selected as a complementary view.

S130: obtaining a complementary 2D image of the target object based on the complementary view.

In the basis of determining camera pose corresponding to the complementary view, the present step is used to obtain the complementary 2D image of the target object. It can be understood that the target object can be taken in a plurality of different views to obtain a plurality of 2D images in different views. The 2D image in complementary view can be obtained by a plurality of ways based on the complementary view. For example, a target image can be selected from a database storing a large number of 2D images of the target object as the complementary 2D image, wherein the view of the target image may be same as or similar to the complementary view. For another example, complementary 2D image of the target object in the complementary view can be captured by adjusting the camera pose based on the complementary view to enable the camera capturing another images of the target object in the complementary view.

S140: performing 3D reconstruction based on the complementary 2D image to generate a complementary 3D object corresponding to the complementary 2D image.

The present step is similar to step 110, except that the step 110 operates on the original 2D image, while the present step 140 operates on the complementary 2D image. For the sake of brevity, it will not be repeated.

In one example, the complementary 3D object is represented by Voxel. It can be understood that visible voxel of the complementary 3D object in the complementary view is different from the visible voxel of the original 3D object in the first view since the complementary 2D image includes credible information which does not exist in the original 2D image.

S150: fusing the original 3D object and the complementary 3D object to obtain a 3D reconstruction result of the target object.

Exemplarily, the final 3D reconstruction result of the target object can be determined by taking a merge set of voxels of the original 3D object and voxels of the complementary 3D object. For any space position, the 3D reconstruction result may be determined to exist voxel at the space position at which either original 3D object or the complementary 3D object has voxels.

Alternatively, the final 3D reconstruction result of the target object can be determined by taking a intersection set of voxels of the original 3D object and voxels of the complementary 3D object. For any space position, the 3D reconstruction result may be determined to exist voxel at the space position at which both original 3D object and the complementary 3D object have voxels.

In the above technical solution, the reconstruction qualities of the original 3D object at each view provide feedback for sampling quality of the view. Therefor, a more reasonable complementary view can be determined based on the feedback, and the complementary 3D object can be reconstructed based on the original 3D object and the complementary 2D image in the complementary view to obtain the final 3D reconstruction result. In this way, the selection of images in the 3D reconstruction can be more targeted, thus improving the efficiency and the quality of the 3D reconstruction.

Exemplarily, the above step S110 may include following steps.

S111: Extracting original image features from the original 2D image. For example, an encoder comprising a Convolutional Neural Networks (CNN) may be used to extract original image features from the original 2D image. The original image features may include a plurality of feature vectors, wherein each of the feature vectors corresponding to a corresponding pixel point in the original 2D image. Taking a single original 2D image as an example, H×W feature vectors can be extracted from the single original 2D image (H indicates the height of the single original 2D image, and W indicates the width of the single original 2D image. The dimensionality of each feature vector is C.

S112: decoding the original image features by a voxel neural network to obtain a voxel cube of the target object. The voxel neural network may include a plurality of 2D convolutional layers which is used to output the voxel cube comprising a plurality of stereo squares based on the original image features.

S113: determining the original 3D object based on the voxel cube. In this step, it may be determined that whether voxels are present at the space position in the stereo squares based on the value of the stereo squares. All present voxels constitute the original 3D object.

Determining the original 3D object based on the voxel cube may use the information of the original 2D image effectively, and make the generated original 3D object closer to the target object.

Figure 2:
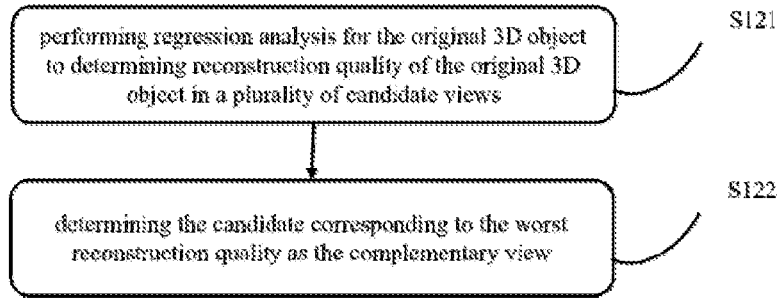
FIG. 2 illustrates a schematic flowchart of selecting a complementary view according to step 120 of an embodiment of the present disclosure.

According to the above description, in the step S120, a complementary view of the target object may be selected from the candidate view based on the reconstruction quality of the original 3D object in the candidate view. FIG. 2 illustrates a schematic flowchart of selecting a complementary view according to step 120 of an embodiment of the present disclosure. As shown in FIG. 2, the step 120 of selecting the complementary view may comprise the following step.

S121: performing regression analysis for the original 3D object to determining reconstruction quality of the original 3D object in a plurality of candidate views.

The regression analysis described above may be implemented using a first neural network. The first neural network may be used to determine and output the reconstruction quality of the original 3D object in different views for any reconstructed 3D object. The original 3D object can be inputted in to the first neural network, and reconstruction quality of the original 3D object in a plurality of candidate views can be predicted by the first neural network.

The plurality of candidate views of the present disclosure may be predetermined, and may correspond to different camera pose respectively. Each camera pose of the candidate view may be expressed as azimuth and elevation angles in a spherical coordinate system. Exemplarily, on the basis of using the original 3D object as the origin of the coordinate system, the camera pose of the candidate views can be determined by selecting azimuth angle as an element in the following set [0,45,90,135,180,225,270,315], elevation angle as an element in the set [−60,−30,0,30,60] and a distance of 1.

The reconstruction quality of the reconstructed object in the candidate view can be measured in various ways.

For example, the reconstruction quality of the reconstructed object in a candidate view may be measured by percentage of the visible voxels of the reconstructed object in the candidate view. The percentage of the visible voxels of the reconstructed object in a candidate view may be the percentage of the visible voxels of the reconstructed object in the first view among the visible voxels in the candidate view. For example, the number of visible voxels of the original 3D object in a candidate view is n, and the number of visible voxels in the first view among the n visible voxels is N, the visibility of the original 3D object in the candidate view is N/n. The higher the percentage of visible voxels, the better the reconstruction quality.

In another embodiments, the reconstruction quality may be measured by a difference degree of the projection depth map of the reconstructed object in a predetermined view. It can be understood that the pixels of the original 3D object in the projection depth map correspond to visible voxels of the original 3D object in the predetermined view respectively. The distance between each visible voxel of the original 3D object and projection plane is the depth value corresponding to the visible voxel, and also is the pixel value of the corresponding pixel in the projection depth map. For example, the original 3D object in a candidate view may comprise visible voxel P, the distance between the visible voxel P and projection plane is d, the corresponding pixel of the visible voxel P in the projection depth map is p', the pixel value of the corresponding pixel p' in the projection depth map is d.

The difference degree of the projection depth map indicates difference degree between the depth map of the original 3D object in the predetermined view and the depth map of the target object in the predetermined view. In can be understood that, the larger the difference degree, the greater the difference between the original 3D object and the target object in the predetermined view, and the reconstruction quality is worse; the smaller the difference degree, the smaller the difference between the original 3D object and the target object in the predetermined view, and the reconstruction quality is better.

S122: determining the candidate corresponding to the worst reconstruction quality as the complementary view.

The reconstruction quality of the original 3D object in each views can be determined using regression analysis and the candidate view corresponding to the worst reconstruction quality may be determined as the complementary view. Thereby, a complementary 2D image may be obtained based on the complementary view, and the 3D reconstruction may be performed again based on the complementary 2D image. It can be compensated for the quality defects of the original 3D object and thus improve the reconstruction quality.

Figure 3:
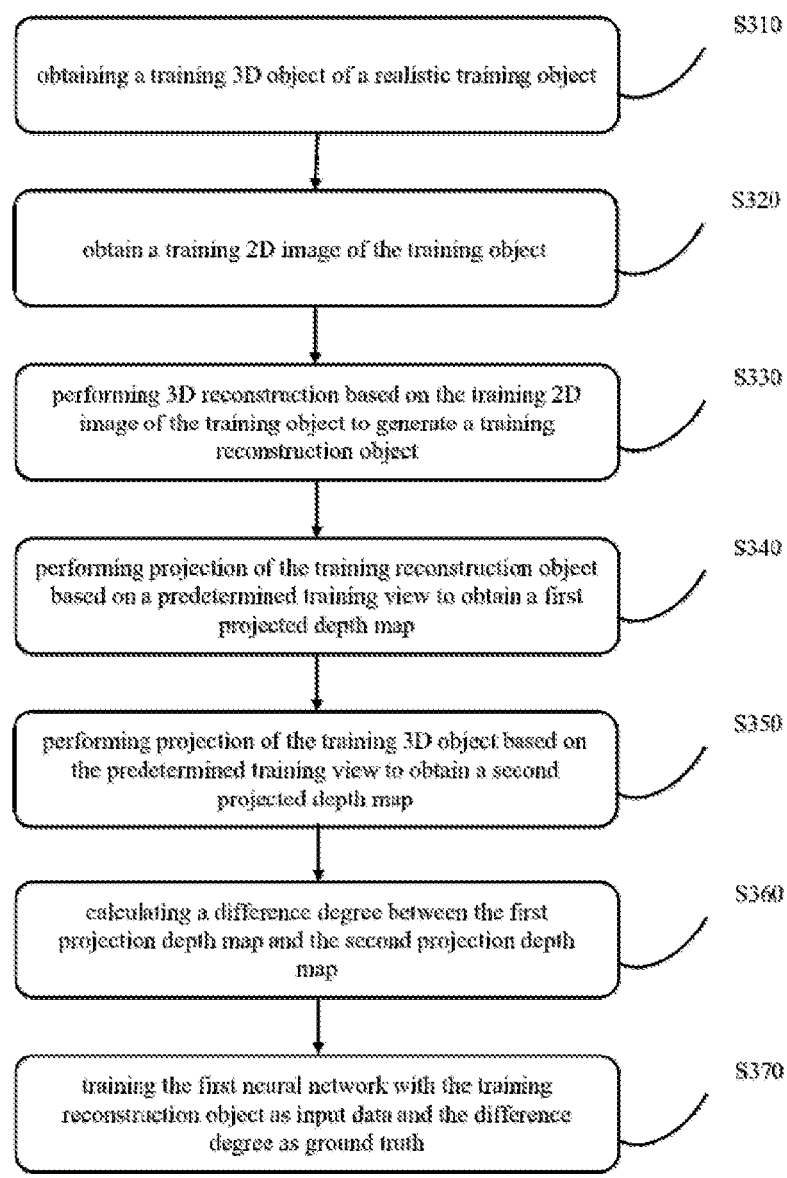
FIG. 3 illustrates a schematic flowchart of training the first neural network according to an embodiment of the present disclosure.

As described above, the reconstruction quality of the original 3D object in a predetermined view may be predicted using the first neural network. The first neural network can be obtained by training. FIG. 3 illustrates a schematic flowchart fro training the first neural network according to an embodiment of the present disclosure. As shown in FIG. 3, the first neural network can be obtained by the following steps.

S310: obtaining a training 3D object of a realistic training object.

The realistic training object is actually existing object with specific shapes and volumes, such as cubes, spheres, cylinders, etc. To achieve better training effect, objects with irregular shapes may be preferred, such as car models, building models, etc.

Further, the realistic training object may be processed into a mathematical model which can be recognizable by the computer. In one example, the realistic training object may be scanned by a scanner to obtain point cloud data. Alternatively, the realistic training object may be converted into corresponding mathematical model by manual modeling. The method of obtaining a training 3D object of a realistic training object does not be limited in the present disclosure.

S320: obtain a training 2D image of the training object.

Photographs of the training object at different view can be directly acquired as training 2D images using imaging devices such as cameras or camcorders. It is also possible to pre-process the photographs acquired, such as filtering, and use the pre-processed photographs as the training 2D images, which is not limited by the present disclosure.

S330: performing 3D reconstruction based on the training 2D image of the training object to generate a training reconstruction object.

The existing 3D reconstruction techniques can be used to perform 3D reconstruction of the training 2D image. In one example, image features are extracted firstly from the training 2D image using an encoder composed of a convolutional neural network, and then the image features are decoded using a decoder composed of a convolutional neural network to determine the training reconstruction object based on the training 2D image. This step is similar to step S110 and will not be repeated here for brevity.

S340: performing projection of the training reconstruction object based on a predetermined training view to obtain a first projected depth map.

The predetermined training view may be a view corresponding to a fixed camera pose. For example, on the basis of using the training reconstruction object as the origin of the coordinate system, a camera pose with an azimuth angle α as an element of the following set: [0,45,90,135,180,225, 270,315], an elevation angle as an element of the set [−60,−30,0,30,60], and a distance of 1 is selected as the camera pose for the predetermined training view.

The projection of the training reconstruction object based on the predetermined training view is equivalent to mapping the visible voxels in the training reconstruction object to pixels in the projection plane. For example, the projection plane is a camera imaging plane. The distance between the visible voxels described above to the projection plane is the pixel value of the corresponding pixel in the projection depth map. For simplicity of description, the projection depth map generated based on the training reconstruction object is referred to as the first projection depth map.

In one example, the projection depth map may be determined based on the voxels of the training reconstruction object which are closest to the projection plane at the training view. The projection plane may be a plane perpendicular to the training view where the camera is located. Assuming that the training view is the direction of the x-axis, the voxels of the training reconstruction object that are closest to the projection plane at the training viewpoint can be determined by the following equation:

$$d(y,z) = \mathrm{argmin}(P(:,y,z)), \text{ wherein } P(:,y,z) > 0$$

Wherein $P(:, y, z)$ indicates all voxels on a line parallel to the X-axis with a Y-axis coordinates of the training reconstruction object as y and a Z-axis coordinates as z. If the voxels of the training reconstruction object exist at a certain position (x, y, z), $P(x, y, z)=1$; otherwise, $P(x, y, z)=0$. In the restricted case, $\mathrm{argmin}(P(:, y, z))$ denotes the minimum value of the distance between the voxels of the training reconstruction object on the line described above and the projection plane. According to the above equation, assuming that m voxels exist and the x-axis coordinates of the m voxels are $\{x1, x2, \ldots, xm\}$, $d(y, z)$ takes the minimum value of the x-axis coordinates, which is equal to $\min\{x1, x2, \ldots, xm\}$. As a result, the projection of the training reconstruction object exists on the line. Otherwise, if no voxels exist, $d(y, z)=0$. As a result, there is no projection of the training reconstruction object on the line. In summary, the projection depth map of the training reconstruction object in the training view can be obtained.

S350: performing projection of the training 3D object based on the predetermined training view to obtain a second projected depth map.

As previously shown, the training 3D object is a mathematical model generated based on a realistic existing object. In one example, the projection of the training 3D object based on the predetermined training view corresponds to mapping the visible voxels in the training 3D object to pixels in a projection plane. The projection plane may be imaging plane of the camera. The distance between the visible voxels described above and the projection plane is the pixel value of the corresponding pixel in the projection depth map. In the example, the projection depth map generated based on the training 3D object is referred to as the second projection depth map.

S360: calculating a difference degree between the first projection depth map and the second projection depth map.

In one example, the difference degree is used to represent the disparity of the first projection depth map relative to the second projection depth map. As described above, the difference degree may be used to measure reconstruction quality of the training reconstruction object. A larger difference degree may indicate that the training reconstruction object is more different from the target 3D object, and therefor the reconstruction quality is worse; A smaller difference degree may indicate that the training reconstruction object is less different from the target 3D object, and therefor the reconstruction quality is better;

Exemplarity, the sum of the difference between the pixels in the first projection depth map and the corresponding pixels in the second projection depth map may be referred as the difference degree.

S370: training the first neural network with the training reconstruction object as input data and the difference degree as ground truth. This enable the first neural network to output the difference degree of the training reconstruction object in the training view for any of the training reconstruction object. Thus, the reconstruction quality of the training reconstructed object in the training view may be determined based on the difference degree.

In the above technical solution, training the first neural network based on the difference degree of the projection depth map may enable the first neural network to accurately determine the reconstruction quality of the reconstructed object. In turn, the accuracy of the final reconstruction result obtained based on the reconstruction quality is ensured.

Figure 4:
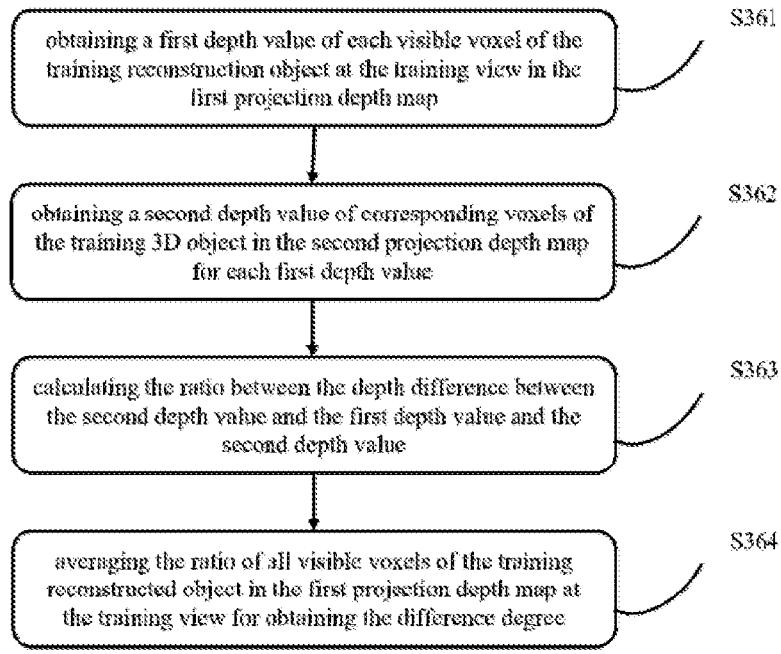
FIG. 4 illustrates a schematic flowchart of calculating the difference degree at step S360 according to some embodiments of the present disclosure.

As described above, the difference degree of disparity of the first projection depth map relative to the second projection depth map can be used as the ground truth for training the first neural network. FIG. 4 illustrates a schematic flowchart of calculating the difference degree at step S360 according to some embodiments of the present disclosure. As shown in FIG. 4, said calculating the difference degree may comprise following steps.

S361: obtaining a first depth value of each visible voxel of the training reconstruction object at the training view in the first projection depth map.

As previously described, the pixel values of the first projection depth map represent depth values of corresponding visible voxels of the training reconstruction object at the training view. In one example, the depth value in the first projection depth map may be referred to as the first depth value.

S362: obtaining a second depth value of corresponding voxels of the training 3D object in the second projection depth map for each first depth value.

As previously described, the pixel values of the second projection depth map represent depth values of corresponding visible voxels of the training 3D object at the training view. Since both the training reconstruction object and the training 3D object are obtained based on the same training object, the corresponding pixel in the second projection depth map may be obtained for each pixel in the first projection depth map, and thus the corresponding pixel value can be used as the second depth value.

For example, if the first depth value D of the voxel P in the first projection depth map has been obtained in step S361, the second depth value D' of the voxel P' corresponding to the voxel P in the second projection depth map is obtained in step S362.

S363: calculating the ratio between the depth difference between the second depth value and the first depth value and the second depth value.

Illustrating the above example, the first depth value D and the second depth value D' are known in step S362, the depth difference between the second depth value and the first depth value is D'−D. Further, the ratio between the depth difference and the second depth value is (D'−D)/D'.

S364: averaging the ratio of all visible voxels of the training reconstructed object in the first projection depth map at the training view for obtaining the difference degree.

It can be understood that the first projection depth map and the second projection depth map may contain multiple voxels, thus multiple difference degrees may be obtained. In one example, the multiple difference degrees may be averaged by the "mean" function, and mean[(D'−D)/D'] may be referred as the final difference degree.

In the above technical solution, the ratio between the depth difference in the projection depth map and the true projection depth values is used as the difference degree for evaluating the reconstruction quality. It is stronger to express the reconstruction quality, and as a result, the reconstruction quality is more accurate, which in turn makes the final reconstruction results more accurate.

Figure 5:
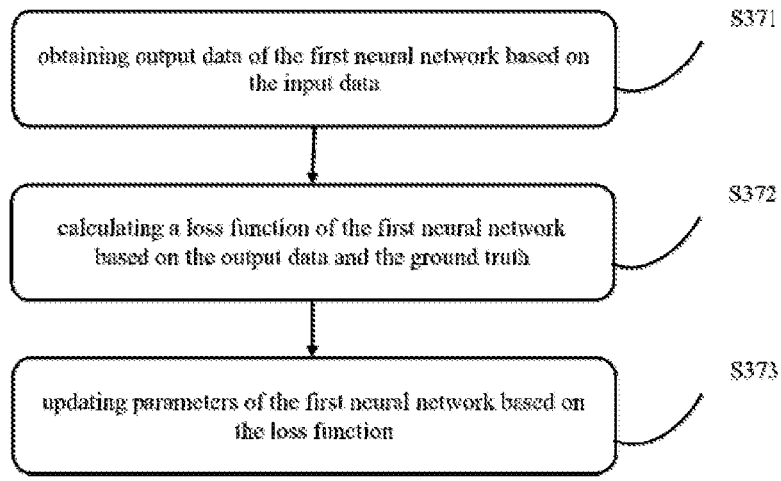
FIG. 5 illustrates a schematic flowchart for training the first neural network in step S370 according to some embodiments of the present disclosure.

As previously described, the first neural network may be trained in step S370 using the training reconstruction object as input data and the difference degree as the ground truth. FIG. 5 illustrates a schematic flowchart for training the first neural network in step S370 according to some embodiments of the present disclosure. As shown in FIG. 5, training the first neural network in the step S370 may include following steps.

S371: obtaining output data of the first neural network based on the input data.

The output data may be obtained by inputting the input data, for example, the training reconstruction object, to the first neural network and the computation of the first neural network. The first neural network may output, for any of the input reconstruction objects, the difference degree of the reconstruction object in the training view. In one example, the input data may be any reconstruction object and the output data may be the difference degree of the depth map of the reconstruction object at the training view.

S372: calculating a loss function of the first neural network based on the output data and the ground truth.

As previously described, the ground truth may be the difference degree between the first projection depth map and the second projection depth map, wherein the first projection depth map is generated based on the training reconstruction object and the second projection depth map is generated based on the training 3D object.

Assuming that the output data of the first neural network is Y and the ground truth obtained from the previous calculation is Y0, the loss function can be determined based on the output data and the ground truth. The loss function is configured to represent the difference between the output data Y and the ground truth Y0. In the embodiment of the present disclosure, one of the following loss functions can be utilized: cross entropy loss function, exponential loss function, square loss function, etc.

S373: updating parameters of the first neural network based on the loss function. In the step, the loss function may be made to take the minimum value by adjusting the parameters in the first neural network. After training, the first neural network can output a more accurate difference degree at the training view for any input reconstruction object. In one example, the predetermined views may include 40 views, and the first neural network may output the difference degree under the corresponding 40 views.

With the above training steps, the output data of the first neural network may be made more accurate. In turn, the final reconstruction results may be made more accurate.

Figure 6:
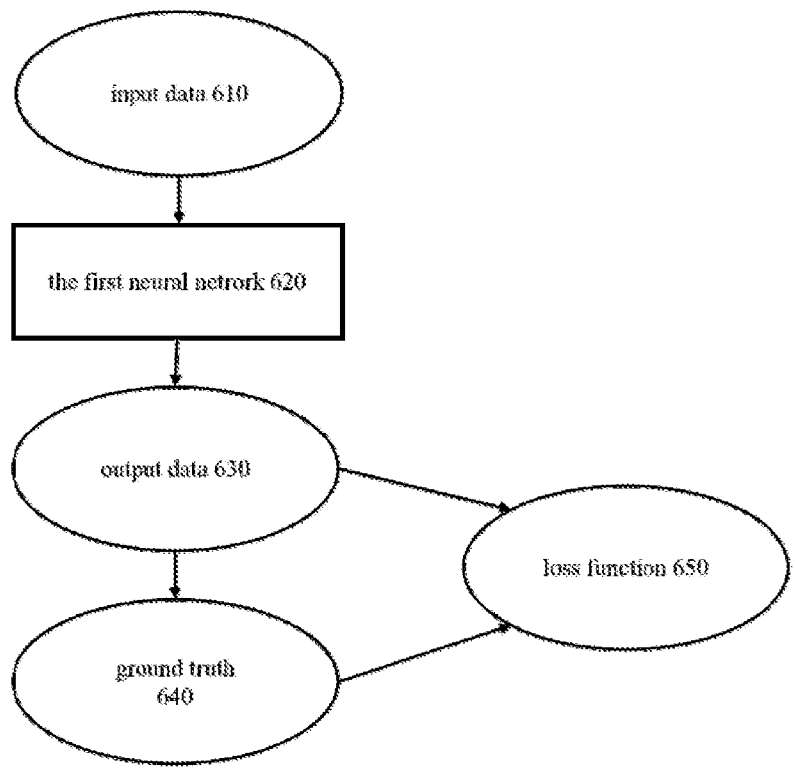
FIG. 6 illustrates a schematic block diagram for training a first neural network according to an embodiment of the present disclosure.

FIG. 6 illustrates a schematic block diagram for training a first neural network according to an embodiment of the present disclosure. As shown in FIG. 6, input data 610 is input to the first neural network 620 to obtain output data 630. Ground truth 640 may be the baseline data used to compare with the output data 630, and loss function 650 may be obtained based on the difference between the input data 630 and the ground truth 640. The value of the loss function 650 may be changed by adjusting the parameters of the first neural network 620 to make the output data 630 closer to the ground truth 640. In one example, the input data 610 may be any 3D reconstruction object generated using 3D reconstruction techniques, the output data 630 may be the difference degree of depth map of the 3D reconstruction object at a plurality of predetermined views, the ground truth 640 may be the difference degree of depth map of the 3D reconstruction object using known training data at a plurality of predetermined views calculated, and the loss function 650 is the squared loss function.

On the basis of complementary view being determined, a complementary 2D image of the target object may be acquired in step S130 described above. The complementary 2D image can be acquired in various ways. In one example, the complementary 2D image may be acquired by a camera, wherein the camera is adjusted based on the camera pose of the complementary view. For example, using the location of the target object as the coordinate origin, if the camera pose of the complementary view in the spherical coordinate system is known to be (α0, β0, ρ0), wherein α0 represents the azimuth of the camera, β0 represents the elevation of the camera, and ρ0 represents the linear distance between the camera and the coordinate origin, then the camera may be adjusted to the position and pose corresponding to (α0, β0, ρ0) for acquiring images of the target object, and thus obtain the complementary 2D image. In the example, the complementary 2D image acquired by the camera may ensures that the complementary 2D image is in the complementary view. As a result, the complementary 2D image may have more information and the final reconstruction result is more accurate.

Figure 7:
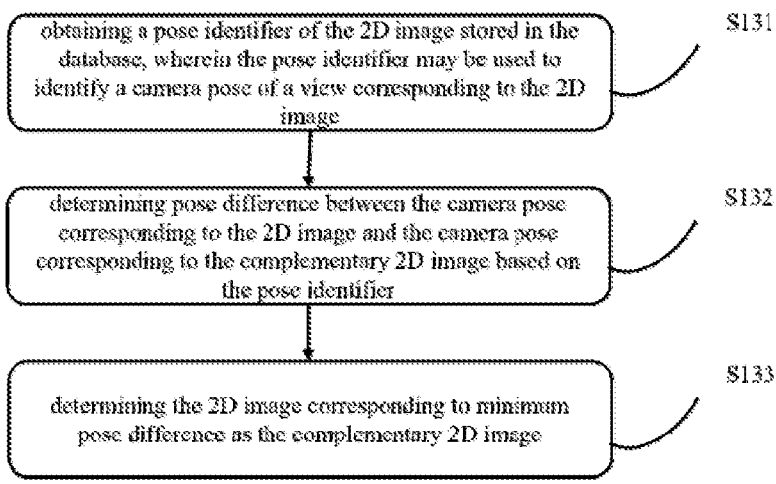
FIG. 7 illustrates a schematic flowchart for selecting the complementary 2D image from the database according to an embodiment of the present disclosure.

In another example, a 2D image corresponding to the view closest to the complementary view is selected from database as the complementary 2D image. FIG. 7 illustrates a schematic flowchart for selecting the complementary 2D image from the database according to an embodiment of the present disclosure. As shown in FIG. 7, the step of selecting a complementary 2D image comprises:

S131: obtaining a pose identifier of the 2D image stored in the database, wherein the pose identifier may be used to identify a camera pose of a view corresponding to the 2D image.

The database may store the pose identifier corresponding to the 2D image when storing the 2D image in the database, which the pose identifier may be the camera pose corresponding to the acquisition of the 2D image. When a 2D image is acquired from the database, the pose identifier corresponding to the 2D image can be acquired together with the 2D image.

S132: determining pose difference between the camera pose corresponding to the 2D image and the camera pose corresponding to the complementary 2D image based on the pose identifier.

In one example, the camera pose corresponding to the 2D image may be represented by azimuth α, elevation β, and distance ρ from the origin of the camera, with using the location of the subject as the origin of the spherical coordinate system. Assuming that the camera pose of the view corresponding to the 2D image is (α1, β1, ρ1) and the camera pose of the complementary view is (α2, β2, ρ2), the pose difference between the camera pose corresponding to the 2D image and the camera pose corresponding to the complementary 2D image can be expressed as (α1−α2, β1−β2, ρ1−ρ2).

S133: determining the 2D image corresponding to minimum pose difference as the complementary 2D image.

As previously described, the pose difference may be a three-dimensional vector consisting of azimuth difference, elevation difference and distance difference. In order to represent the magnitude of the pose difference, the three-dimensional vector can be normalized to a numerical value. In one example, the azimuth difference, elevation difference and distance difference can be squared and the sum of squares can be used as the pose difference, for comparing the magnitude of the pose difference. It can be understood that the ideal situation is that the pose difference is zero, the camera pose of the view corresponding to the 2D image may overlap exactly with the camera pose of the complementary view. If a 2D image with zero pose difference is not available from the database, the 2D image with the smallest pose difference may be selected as the complementary 2D image.

Through the above steps, the 2D image closest to the complementary view can be selected as the complementary 2D image from the database storing a large number of images, and 3D reconstruction can be performed based on the complementary 2D image. By directly using the existing 2D images in the database as a complementary of the original 2D images, it not only ensures the accuracy of the final reconstruction results and effectively uses the existing resources, but also avoids the trouble of reacquiring images.

It can be understood that the more complementary views are selected, the more complementary 3D objects are generated, and thus the 3D reconstruction results are closer to the real shape of the target object. Therefore, the process of steps S120 to S150 can be iterated several times and the final 3D reconstruction result can be determined based on that whether the iteration termination condition is satisfied.

Exemplarily, the above 3D reconstruction method may also include the following steps: determining whether the percentage of visible voxels in the 3D reconstruction result is greater than a first proportion. In response to that it is not greater than the first proportion, the current 3D reconstruction result is taken as the original 3D object, and the 3D reconstruction is performed again based on the complementary view until the percentage of visible voxels in the 3D reconstruction result is greater than the first proportion. In other words, in the step, the current 3D reconstruction result is used as the original 3D object and the above steps S120 to S150 are re-executed again until the desired final reconstruction result is obtained.

Figure 8:
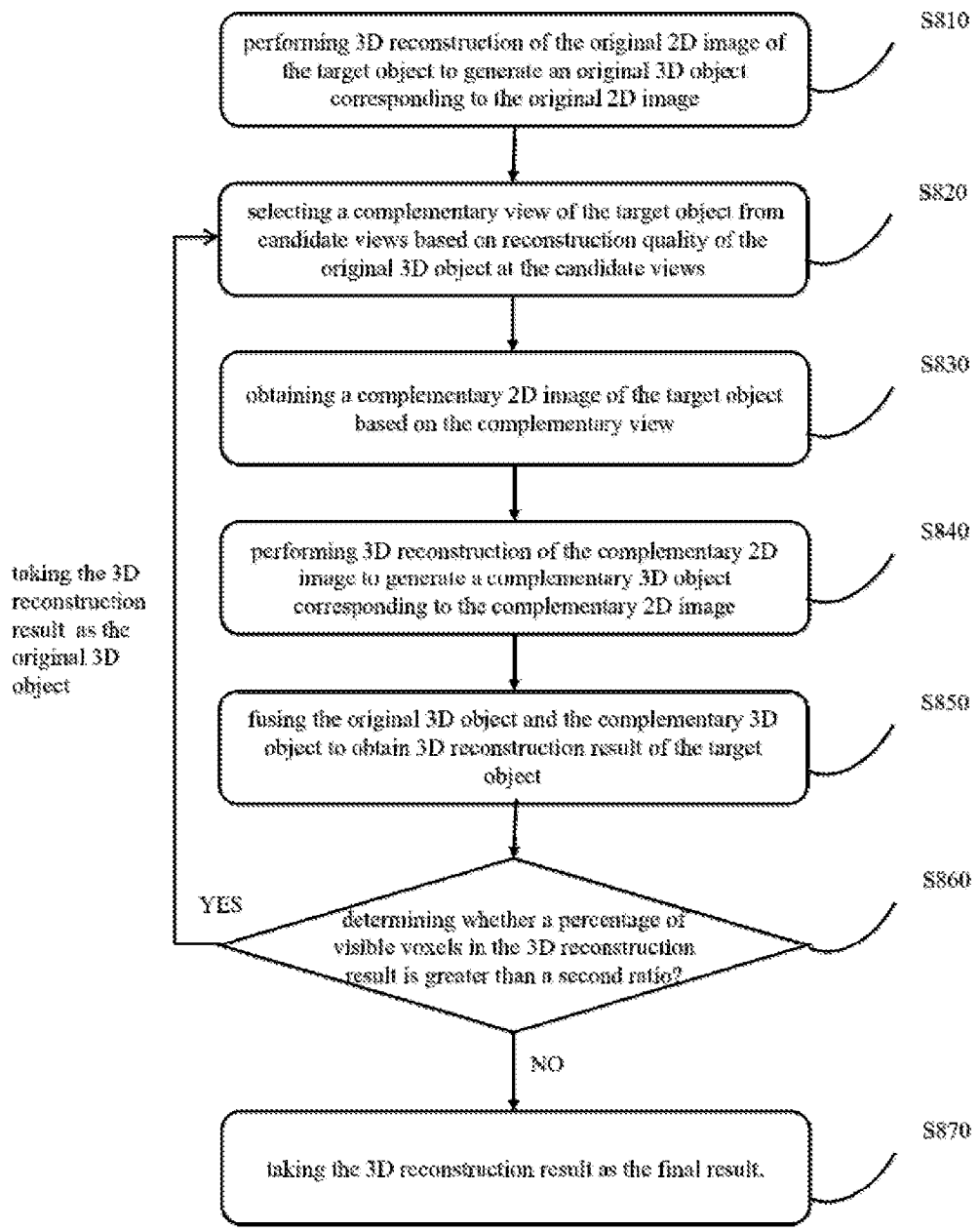
FIG. 8 illustrates a schematic flowchart of a method 800 for 3D reconstruction according to another embodiment of the present disclosure.

FIG. 8 illustrates a schematic flowchart of a method 800 for 3D reconstruction according to another embodiment of the present disclosure. As shown in FIG. 8, the method for 3D reconstruction comprises following steps.

S810: performing 3D reconstruction of the original 2D image of the target object to generate an original 3D object corresponding to the original 2D image.

S820: selecting a complementary view of the target object from candidate views based on reconstruction quality of the original 3D object at the candidate views.

S830: obtaining a complementary 2D image of the target object based on the complementary view.

S840: performing 3D reconstruction of the complementary 2D image to generate a complementary 3D object corresponding to the complementary 2D image.

S850: fusing the original 3D object and the complementary 3D object to obtain 3D reconstruction result of the target object. The above steps are similar to steps S110-S150 and will not be repeated herein.

S860: determining whether a percentage of visible voxels in the 3D reconstruction result is greater than a second ratio.

The percentage of visible voxels in the 3D reconstruction result is the percentage of the visible voxels of the 3D reconstruction result in the first view among the visible voxels in the supplementary view. For example, if there are m visible voxels in the complementary view, and the number of voxels visible in the first view is M, the percentage of visible voxels is M/m. It can be understood that the percentage of visible voxels may reflect the confidence of the 3D reconstruction result. The second ratio can be any value between 70% and 90%. In one example, the second ratio may be 85%. The value balances the consumption of computational resources and the accuracy of the computational results.

If the percentage of visible voxels in the 3D reconstruction result is not greater than the second ratio, the 3D reconstruction result may be taken as the original 3D object and transferred to step S820. Thereby, a new complementary 2D image is acquired again for 3D reconstruction based on a new complementary view. If the percentage of visible voxels is not greater than the second ratio, it means that there is still a gap between the current 3D reconstruction result and the target object, so it is necessary to perform 3D reconstruction based on the camera pose of the new complementary view again.

If the percentage of visible voxels in the 3D reconstruction result is greater than the second ratio, step S870 is executed.

S870: taking the 3D reconstruction result as the final result. The 3D reconstruction method ends.

If the percentage of visible voxels is greater than the second ratio, it means that the 3D reconstruction result generated in the current view is already closer to the real 3D object, the 3D reconstruction result can be taken as the final result.

Through the above steps, it can be ensured that the 3D reconstruction result obtained after a limited number of iterations is the expected result, further ensuring the quality of the 3D reconstruction object.

Figure 9:
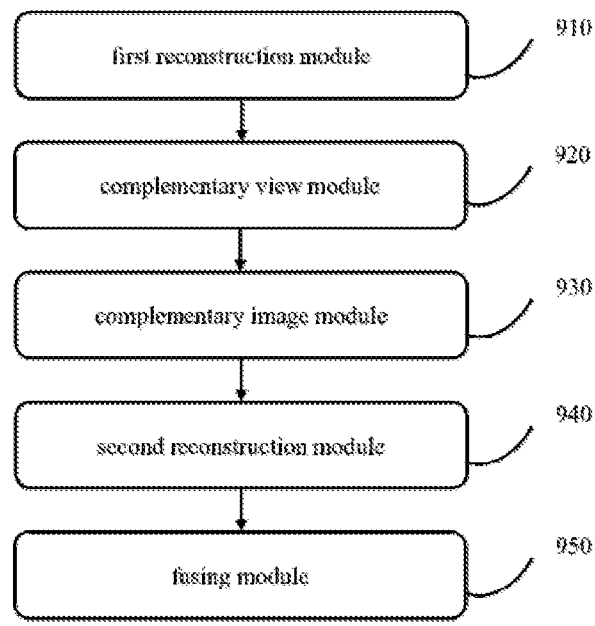
FIG. 9 illustrates a schematic block diagram of a device for 3D reconstruction according to an embodiment of the present disclosure.

According to another aspect of the present disclosure, a device for 3D reconstruction is also provided. FIG. 9 illustrates a schematic block diagram of a device for 3D reconstruction according to an embodiment of the present disclosure.

As shown in FIG. 9, the device 900 comprises a first reconstruction module 910, a complementary view module 920, a complementary image module 930, a second reconstruction module 940 and a fusing module 950.

Each module may execute various steps/functions of the method for 3D reconstruction described above respectively. Only the main functions of the components of the device 900 are described below, and the details already described above are omitted.

The first reconstruction module 910, is configured to perform 3D reconstruction of an original 2D image of a target object to generate an original 3D object corresponding to the original 2D image.

The complementary view module 920, is configured to select a complementary view of the target object from candidate views based on reconstruction quality of the original 3D object at the candidate views.

The complementary image module 930, is configured to obtain a complementary 2D image of the target object based on the complementary view.

The second reconstruction module 940, is configured to perform 3D reconstruction of the complementary 2D image to generate a complementary 3D object corresponding to the complementary 2D image.

The fusing module 950, is configured to fuse the original 3D object and the complementary 3D object to obtain 3D reconstruction result of the target object.

According to a further aspect of the present disclosure, there is also provided a system for 3D reconstruction comprising: a processor and a memory, wherein the memory stores computer program instructions, the computer program instructions being used to perform the method for 3D reconstruction described above when executed by the processor.

Figure 10:
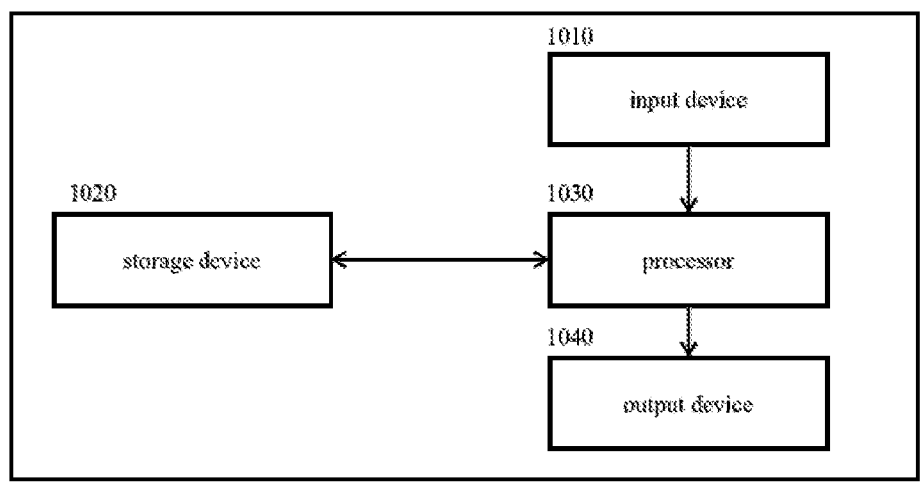
FIG. 10 illustrates a schematic block diagram of a system 1000 for 3D reconstruction according to an embodiment of the present disclosure.

FIG. 10 illustrates a schematic block diagram of a system 1000 for 3D reconstruction according to an embodiment of the present disclosure. As shown in FIG. 10, the system 1000 may include an input device 1010, a storage device 1020, a processor 1030, and an output device 1040.

The input device 1010 is configured to receive operation instructions entered by an user and to collect data. The input device 1010 may include one or more of a keyboard, a mouse, a microphone, a touch screen, and an image capture device.

The storage device 1020 may store computer program instructions for implementing the steps in the method for 3D reconstruction according to embodiments of the present disclosure.

The processor 1030 is configured to execute the computer program instructions stored in the storage device 1020 to perform the steps of the method for 3D reconstruction according to the embodiment of the present disclosure, and is configured to implement the first reconstruction module 910, the complementary view module 920, the complementary image module 930, the second reconstruction module 940 and the fusing module 950 in the device for 3D reconstruction according to the embodiment of the present disclosure.

The output device 1040 is configured to output various information (e.g., images and/or sound) to an external party (e.g., a user) and may include one or more of a display, a speaker, etc.

In one embodiment, the system 1000 may perform following steps when the computer program instructions is executed by the processor 1030:

Performing 3D reconstruction of the original 2D image of the target object to generate an original 3D object corresponding to the original 2D image.

Selecting a complementary view of the target object from candidate views based on reconstruction quality of the original 3D object at the candidate views.

Obtaining a complementary 2D image of the target object.

Performing 3D reconstruction of the complementary 2D image to generate a complementary 3D object corresponding to the complementary 2D image.

Fusing the original 3D object and the complementary 3D object to obtain 3D reconstruction result of the target object.

Further, according to a further aspect of the present disclosure, there is provided a storage medium on which program instructions are stored. when the program instructions are executed by a computer or processor, the computer or processor may be enabled to perform the corresponding steps of the above-described method for 3D reconstruction according to an embodiment of the present disclosure, and the program instructions may be configured to implement the corresponding module in the above-described device for 3D reconstruction according to an embodiment of the present disclosure or the above-described module for the system for 3D reconstruction. The storage medium may include, for example, a memory card of a smart phone, a storage component of a tablet computer, a hard disk of a personal computer, a read-only memory (ROM), an erasable programmable read-only memory (EPROM), a portable compact disk read-only memory (CD-ROM), a USB memory, or any combination of the storage mediums. The computer-readable storage medium may be any combination of one or more computer-readable storage media.

In one embodiment, the computer program instructions, when execute by the computer or processor, may cause the computer or processor to perform the following steps:

Performing 3D reconstruction of the original 2D image of the target object to generate an original 3D object corresponding to the original 2D image.

Selecting a complementary view of the target object from candidate views based on reconstruction quality of the original 3D object at the candidate views.

Obtaining a complementary 2D image of the target object.

Performing 3D reconstruction of the complementary 2D image to generate a complementary 3D object corresponding to the complementary 2D image.

Fusing the original 3D object and the complementary 3D object to obtain 3D reconstruction result of the target object.

A person of ordinary skill in the art can understand the specific implementation of the above device, system, and storage medium for 3D reconstruction by reading the above description related to the method for 3D reconstruction with reference to FIGS. 1 to 8. For the sake of brevity, they are not repeated here.

The above scheme for 3D reconstruction may determine the complementary view according to the reconstruction quality of the original 3D object, and use the complementary 2D image under the complementary view for 3D reconstruction, which can obtain a high-quality reconstruction 3D object using fewer two-dimensional images.

While exemplary embodiments have been described by referring to the accompanying drawings herein, it should be understood that the above exemplary embodiments are illustrative only and are not intended to limit the scope of the present disclosure thereto. An ordinary person skilled in the art may make various modifications and alterations without departing from the scope and spirit of the present disclosure. It is intended that all these modifications and alterations be encompassed within the appended claims.

Those skilled in the art may understand that the technical solutions of the present disclosure may be implemented in the form of electronic hardware, computer software, or integration of the hardware and software by combining the exemplary units and algorithm steps described in the embodiments of the present disclosure. Whether the functions are implemented in hardware or software depends on specific applications and designed limitations of the technical solutions. Those skilled in the art may use different methods to implement the functions in the case of the specific applications. However, this implementation shall not be considered going beyond the scope of the present disclosure.

In the exemplary embodiments provided in the present disclosure, it should be understood that the disclosed system, apparatus, and device, and method may also be implemented in other manners. For example, the apparatus embodiments are merely exemplary ones. For example, the units are divided only by the logic function. In practical implementation, other division manners may also be used. For example, a plurality of units or elements may be combined or may be integrated into a system, or some features may be ignored or not implemented.

A large number of specific details are described in the description provided herein. However, it can be appreciated that embodiments of the disclosure can be implemented without these specific details. In some examples, known methods, structures and techniques are not shown in detail so as not to blur understanding of the description.

Similarly, it should be appreciated that in order to simplify the disclosure and help to understand one or more of various aspects of the disclosure, some features of the disclosure may, in certain cases, be combined in a single embodiment, diagram or description thereof in the above description of illustrative embodiments of the disclosure. However, this method of the disclosure is not to be interpreted as reflecting an intention that the claimed embodiments of the subject matter require more features than are expressly recited in each claim. More specifically, as the following claims reflect, the disclosure may lie in less than all features of a single disclosed embodiment. Thus the claims following the specific embodiments are hereby incorporated into the detailed description, with each claim standing on its own as a separate embodiment.

It will be understood by those skilled in the art that all features disclosed in this specification (including accompanying claims, abstracts and drawings) and all processes or units of any disclosed method or apparatus can be combined by any combination except for the mutual exclusion of features. Unless otherwise expressly stated, each feature disclosed in this specification (including accompanying claims, abstracts, and drawings) may be replaced by an alternative feature providing the same, equivalent, or similar purpose.

Furthermore, while some embodiment described herein include some but not other features included in other embodiments, combinations of features of different embodiments are meant to be within the scope of the disclosure and form different embodiments, as would be understood by those skilled in the art. For example, in the following claims, any one of the claimed embodiments can be combined in any combination.

Each component embodiment of the present disclosure may be implemented in hardware, in software modules running on one or more processors, or in combination thereof. It should be understood by those skilled in the art that some or all functions of some modules in the image registration apparatus and the image stitching device according to the embodiment of the present disclosure can be realized in practice by using a microprocessor or a digital signal processor (DSP). The present disclosure may also be implemented as an apparatus program (for example, a computer program and a computer program product) for performing part or all of the methods described herein. Such a program to implement the present disclosure may be stored on a computer-readable medium, or may have one or more signals in the form. Such signals can be downloaded from Internet sites, or provided on carrier signals, or in any other form.

It should be noted that the above-mentioned embodiments illustrate rather than limit the disclosure, and that those skilled in the art will be capable of designing many alternative embodiments without departing from the scope of the disclosure as defined by the appended claims. Any reference sings placed between parentheses shall not be construed as limiting the claim. The word "comprising" does not exclude the presence of elements or steps not listed in a claim. The word "a" or "an" preceding an element does not exclude the presence of a plurality of such elements. The disclosure can be implemented by means of hardware comprising several distinct elements and by means of a suitable programmed computer. Several of these means can be embodied by one and the same item of hardware. The use of the words first, second, and third etc. do not indicate any ordering. These words are to be interpreted as names.

The above, only for the specific embodiment of the present disclosure or a description of the specific embodiment, the scope of protection of the present disclosure is not limited to this, any technical person familiar with the technical field disclosed in the scope of the technology, can easily think of change or replacement, should be covered within the scope of protection of the present disclosure. The protection scopes of the present disclosure shall be subject to the protection scopes of the claims.

What is claimed is:

1. A method for three-dimensional (3D) reconstruction, comprising:
   performing a 3D reconstruction of an original two-dimensional (2D) image of a target object to generate an original 3D object corresponding to the original 2D image;

selecting a complementary view of the target object from candidate views based on a reconstruction quality of the original 3D object at the candidate views;

obtaining a complementary 2D image of the target object based on the complementary view;

performing a 3D reconstruction of the complementary 2D image to generate a complementary 3D object corresponding to the complementary 2D image; and fusing the original 3D object and the complementary 3D object to obtain a 3D reconstruction result of the target object.

2. The method according to claim 1, wherein the performing of the 3D reconstruction of the original 2D image of the target object comprising:

extracting original image features from the original 2D image;

decoding the original image features by a voxel neural network to obtain a voxel cube of the target object; and determining the original 3D object based on the voxel cube.

3. The method according to claim 1, wherein the selecting of the complementary view of the target object from the candidate views comprising:

performing a regression analysis for the original 3D object to determine the reconstruction quality of the original 3D object at the candidate views; and determining a candidate view corresponding to a worst reconstruction quality as the complementary view.

4. The method according to claim 3, wherein the performing of the regression analysis for the original 3D object is implemented by a first neural network, wherein the first neural network is trained by:

obtaining a training 3D object of a realistic training object;

obtaining a training 2D image of the training 3D object, and performing a 3D reconstruction based on the training 2D image of the training 3D object to generate a training reconstruction object;

performing a projection of the training reconstruction object based on a predetermined training view to obtain a first projected depth map;

performing a projection of the training 3D object based on the predetermined training view to obtain a second projected depth map;

calculating a difference degree between the first projection depth map and the second projection depth map; and training the first neural network with the training reconstruction object as input data and the difference degree as a ground truth.

5. The method according to claim 4, wherein the calculating of the difference degree between the first projection depth map and the second projection depth map comprising:

obtaining a first depth value of each visible voxel of the training reconstruction object at the predetermined training view in the first projection depth map;

obtaining a second depth value of corresponding voxels of the training 3D object in the second projection depth map for each first depth value;

calculating a ratio between a depth difference between the second depth value and the first depth value and the second depth value; and averaging a ratio of all visible voxels of the training reconstructed object in the first projection depth map at the predetermined training view for obtaining the difference degree.

6. The method according to claim 4, wherein the training of the first neural network comprising:

obtaining output data of the first neural network based on the input data;

calculating a loss function of the first neural network based on the output data and the ground truth; and updating parameters of the first neural network based on the loss function.

7. The method according to claim 1, wherein the obtaining of the complementary 2D image of the target object based on the complementary view comprising:

selecting a 2D image corresponding to a view closest to the complementary view from database as the complementary 2D image; or acquiring the complementary 2D image by a camera, wherein the camera is adjusted based on a camera pose of the complementary view.

8. The method according to claim 7, wherein the selecting of the 2D image corresponding to the view closest to the complementary view from database comprising:

obtaining a pose identifier of the 2D image stored in the database, wherein the pose identifier is used to identify a camera pose of a view corresponding to the 2D image;

determining a pose difference between the camera pose corresponding to the 2D image and the camera pose corresponding to the complementary 2D image based on the pose identifier; and determining the 2D image corresponding to a minimum pose difference as the complementary 2D image.

9. The method according to claim 1, further comprising:

determining whether a percentage of visible voxels in the 3D reconstruction result is greater than a first proportion; and in response to that the percentage of the visible voxels in the 3D reconstruction result is not greater than the first proportion, taking the 3D reconstruction result as the original 3D object, and performing the 3D reconstruction again based on the complementary view until the percentage of visible voxels in the 3D reconstruction result is greater than the first proportion.

10. A system for 3D reconstruction, comprising: a processor and a memory, wherein, the memory stores computer program instructions, and the computer program instructions are configured to be executed by the processor to perform the method for 3D reconstruction according to claim 1.

11. A non-transitory storage medium storing computer program instructions, wherein the computer program instructions are executed to perform the method for 3D reconstruction according to claim 1.

12. The system according to claim 10, wherein the performing of the 3D reconstruction of the original 2D image of the target object comprising:

extracting original image features from the original 2D image;

decoding the original image features by a voxel neural network to obtain a voxel cube of the target object; and determining the original 3D object based on the voxel cube.

13. The system according to claim 10, wherein the selecting of the complementary view of the target object from candidate views comprising:

performing a regression analysis for the original 3D object to determine the reconstruction quality of the original 3D object at the candidate views; and determining a candidate view corresponding to a worst reconstruction quality as the complementary view.

14. The system according to claim 13, wherein the performing of the regression analysis for the original 3D object is implemented by a first neural network, wherein the first neural network is trained by:
- obtaining a training 3D object of a realistic training object;
- obtaining a training 2D image of the training 3D object, and performing a 3D reconstruction based on the training 2D image of the training 3D object to generate a training reconstruction object;
- performing a projection of the training reconstruction object based on a predetermined training view to obtain a first projected depth map;
- performing a projection of the training 3D object based on the predetermined training view to obtain a second projected depth map;
- calculating a difference degree between the first projection depth map and the second projection depth map; and
- training the first neural network with the training reconstruction object as input data and the difference degree as a ground truth.

15. The system according to claim 14, wherein the calculating of the difference degree between the first projection depth map and the second projection depth map comprising:
- obtaining a first depth value of each visible voxel of the training reconstruction object at the predetermined training view in the first projection depth map;
- obtaining a second depth value of corresponding voxels of the training 3D object in the second projection depth map for each first depth value;
- calculating a ratio between a depth difference between the second depth value and the first depth value and the second depth value; and
- averaging a ratio of all visible voxels of the training reconstructed object in the first projection depth map at the predetermined training view for obtaining the difference degree.

16. The system according to claim 14, wherein the training of the first neural network comprising:
- obtaining output data of the first neural network based on the input data;
- calculating a loss function of the first neural network based on the output data and the ground truth; and
- updating parameters of the first neural network based on the loss function.

17. The system according to claim 10, wherein the obtaining of the complementary 2D image of the target object based on the complementary view comprising:
- selecting a 2D image corresponding to a view closest to the complementary view from database as the complementary 2D image; or
- acquiring the complementary 2D image by a camera, wherein the camera is adjusted based on a camera pose of the complementary view.

18. The system according to claim 17, wherein the selecting of the 2D image corresponding to the view closest to the complementary view from database comprising:
- obtaining a pose identifier of the 2D image stored in the database, wherein the pose identifier is used to identify a camera pose of a view corresponding to the 2D image;
- determining a pose difference between the camera pose corresponding to the 2D image and the camera pose corresponding to the complementary 2D image based on the pose identifier; and
- determining the 2D image corresponding to a minimum pose difference as the complementary 2D image.

19. The system according to claim 10, further comprising:
- determining whether a percentage of visible voxels in the 3D reconstruction result is greater than a first proportion; and
- in response to that the percentage of the visible voxels in the 3D reconstruction result is not greater than the first proportion, taking the 3D reconstruction result as the original 3D object, and performing the 3D reconstruction again based on the complementary view until the percentage of visible voxels in the 3D reconstruction result is greater than the first proportion.

20. A device for three-dimensional (3D) reconstruction, comprising:
- a first reconstruction module configured to perform a 3D reconstruction of an original two-dimensional (2D) image of a target object to generate an original 3D object corresponding to the original 2D image;
- a complementary view module configured to select a complementary view of the target object from candidate views based on a reconstruction quality of the original 3D object at the candidate views;
- a complementary image module configured to obtain a complementary 2D image of the target object based on the complementary view;
- a second reconstruction module configured to perform a 3D reconstruction of the complementary 2D image to generate a complementary 3D object corresponding to the complementary 2D image; and
- a fusing module configured to fuse the original 3D object and the complementary 3D object to obtain a 3D reconstruction result of the target object.

* * * * *